A. J. VAN STOCKUM.
SUBMARINE VESSEL.
APPLICATION FILED AUG. 5, 1913.
1,223,747.
Patented Apr. 24, 1917.
2 SHEETS—SHEET 1.
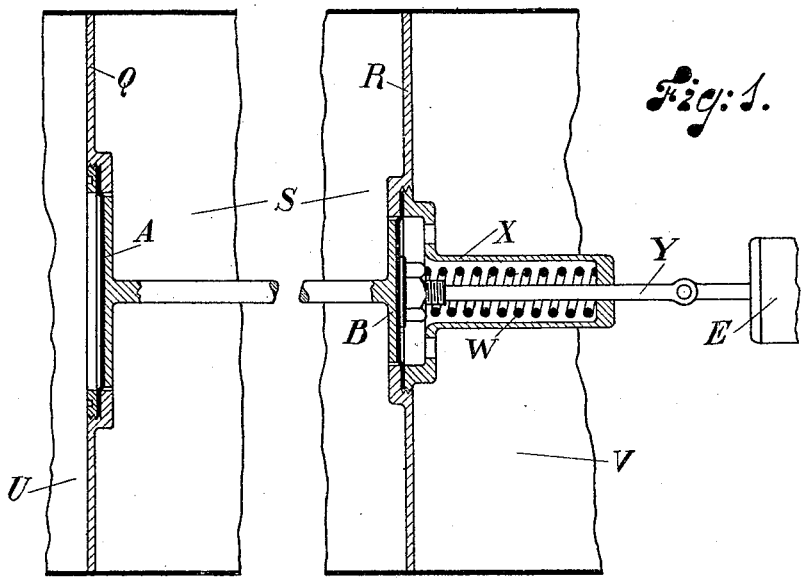
Fig: 1.
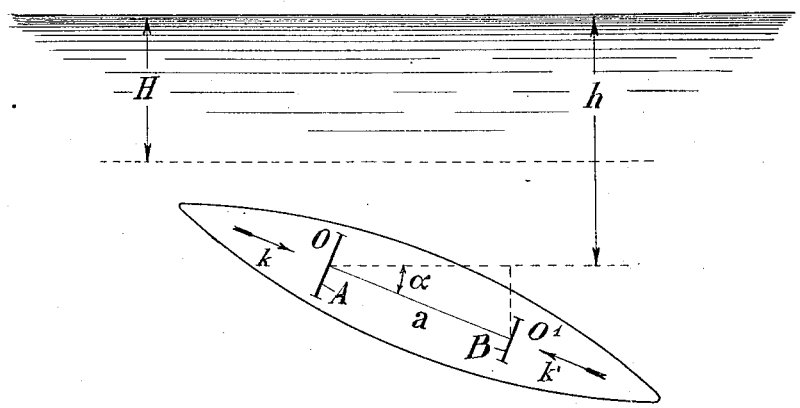
Fig: 2.
Witnesses
John W. Hoving
B. W. Appleton
Inventor
A. J. VAN STOCKUM
By W. H. Berrigan
Attorney A. J. VAN STOCKUM.
SUBMARINE VESSEL.
APPLICATION FILED AUG. 5, 1913.
1,223,747.
Patented Apr. 24, 1917.
2 SHEETS—SHEET 2.
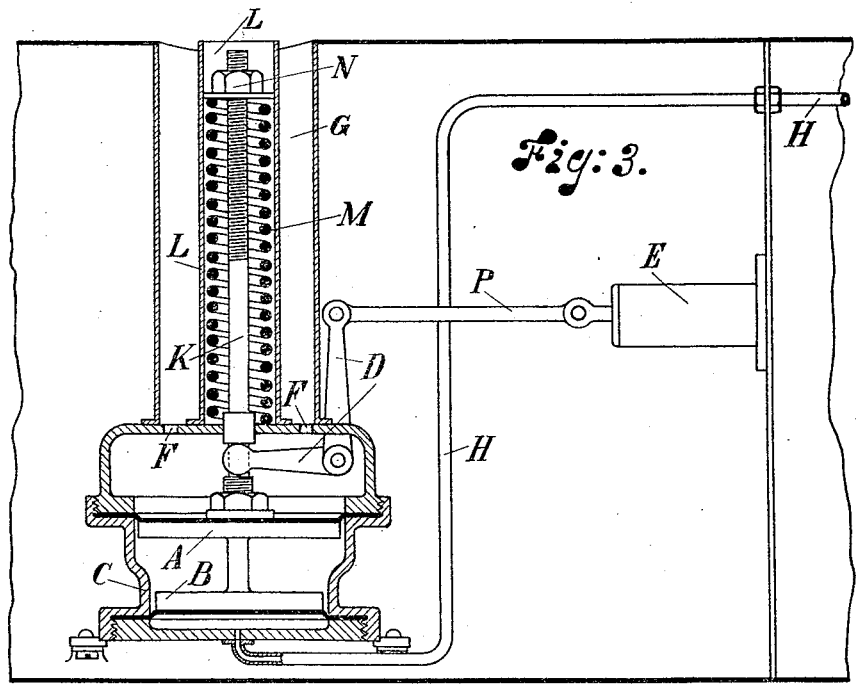
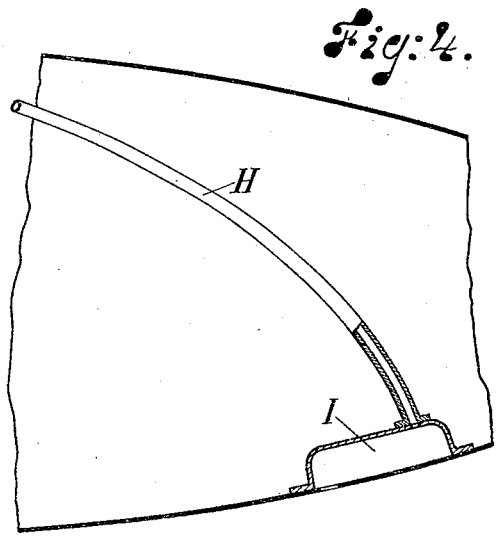
Witnesses
John H. Hoving
B. W. Appleton
Inventor
A. J. van Stockum
By ........
Attorney

UNITED STATES PATENT OFFICE.

ABRAHAM JOHANNES van STOCKUM, OF RIJSWIJK, NETHERLANDS.

SUBMARINE VESSEL.

1,223,747.

Specification of Letters Patent.

Patented Apr. 24, 1917.

Application filed August 5, 1913. Serial No. 783,094.

*To all whom it may concern:*

Be it known that I, ABRAHAM JOHANNES VAN STOCKUM, subject of the Queen of the Netherlands, residing at Rijswijk, Kingdom of the Netherlands, have invented certain new and useful Improvements in Submarine Vessels, of which the following is a specification.

This invention relates to submarine vessels, torpedoes and the like, and has for its object to provide a vessel of this character with improved arrangements for regulating the depth of submersion of the vessel during its passage through the water.

In order to insure a torpedo or other submarine vessel moving along its course at a uniform depth of submersion it is evidently necessary that the depth-controlling arrangements should be independent of the speed of movement of the vessel, and this feature constitutes an important advantage of the present invention, which consists essentially in the provision of two or more abutments subject to the opposing action of the pressure of the water at different points along the longitudinal axis of the torpedo. The opposing action of the water pressure at these points upon the abutments is arranged to be different, the difference being opposed by a constant controlling force, such for instance as a spring or the atmospheric air pressure within the body of the vessel. The horizontal rudder or equivalent device serving to determine the rise or fall of the course taken by the torpedo is arranged to be under the control of the abutments above referred to, in such a manner that the difference between the opposing action of the water pressure at the two longitudinally separated points of the vessel is exactly opposed and balanced by the spring or other controlling force when the vessel is at the desired depth, the position of the abutments under these circumstances being such as to cause the horizontal rudder to be parallel to the axis of the torpedo and thus insure the vessel following a horizontal course. At other depths of submersion the controlling force will be greater or less than the difference between the opposing actions of the water pressure at the two points along the torpedo, and the horizontal rudder will be deflected downward or upward so as to cause the axis of the torpedo to become inclined to the horizontal so as to follow an ascending or descending course. The inclination of the axis of the vessel necessarily alters the relative pressure of the water acting upon the abutments, due to the latter being submerged to different depths, and the horizontal rudder will be restored to its normal position parallel to the axis of the vessel as soon as the inclination of this axis to the horizonal is sufficient to restore equilibrium between the pressures upon the abutments and the controlling force.

In a preferred constructional embodiment of the invention two diaphragms constituting abutments are employed having different effective areas, the larger diaphragm being located at or arranged to be effected by the pressure of the water adjacent to the front of the torpedo. The two diaphragms are mechanically connected together by means of a rod, which is also secured to a controlling spring, and the valve rod of a pilot motor or other device serving to operate the horizontal rudder.

The invention is illustrated in the accompanying drawings, of which Figure 1 is a view in longitudinal section of a portion of a torpedo provided with a depth-controlling mechanism constructed in accordance with the invention:

Fig. 2 is a diagrammatic view illustrating a submarine torpedo and will be hereinafter referred to in explaining the action of the depth-controlling mechanism:

Fig. 3 is a view similar to Fig. 1 but illustrating a modified form of construction:

Fig. 4 is a continuation of Fig. 3.

Referring now to the drawings, in Fig. 1 the invention is illustrated as embodied in its simplest form, the depth regulating mechanism comprising two diaphragms indicated at A and B respectively as located within partitions Q, R separating the intermediate portion S of the torpedo from the outer portions U and V, to which free access of the water at either end of the torpedo is permitted. The pressure on the outer face of the diaphragm A which is the larger of the two diaphragms and is located in the front portion of the torpedo, will thus be dependent upon the depth of immersion of this portion of the vessel, the pressure on the outer face of the smaller diaphragm B located adjacent to the stern of the torpedo being similarly proportional to the depth of immersion of this portion of the vessel. The pressure on the inner faces of the diaphragms A and B is the same corresponding to the pressure within the interior of the intermediate portion S of the torpedo. The diaphragms A and B are connected together by means of a rod, as shown in Fig. 1, which extends through the diaphragm B, as shown at Y, and is surrounded by a helical spring W mounted in a casing X. The rod Y is connected to the valve mechanism of a pilot motor E of any preferred form, serving to operate the horizontal rudder. As will be readily seen from a consideration of Fig. 1, the pressure of the water at the front and rear ends of the torpedo will exert an opposing action on the diaphragms A and B, and assuming that the torpedo is horizontal the total pressure upon the diaphragm A will be greater than the total pressure exerted on the diaphragm B, the difference between these total pressures being opposed and counterbalanced by the force of the spring W. The rod Y will thus under all circumstances take up such a position that the pressure due to the compression of the spring W will be equal and opposite to the difference between the total pressures of the water acting upon the diaphragms A and B. If the torpedo is too deeply immersed the difference between the pressures acting upon the diaphragms A and B will be greater than its normal value, and the diaphragms A and B together with the rod Y will be moved toward the right, thereby causing the pilot motor E to deflect the horizontal rudder in the required direction, the converse action occurring if the depth of submersion of the torpedo is too small, in which case the diaphragms A and B will be moved toward the left under the action of the spring W, with a corresponding adjustment of the horizontal rudder.

When the torpedo is ascending or descending from a depth of submersion below or above the predetermined depth, its longitudinal axis will be inclined to the horizontal at an angle hereinafter termed the angle of inclination, and it will be seen from a consideration of Fig. 2 that this angle of inclination will be greater the greater the distance of the torpedo from its proper depth of submersion.

Referring now to Fig. 2, the distance apart of the two diaphragms A and B along the longitudinal axis of the torpedo is indicated at $a$, and the angle of inclination of this axis at $\alpha$. The desired depth of submersion is indicated at H, the actual depth of submersion under consideration of the diaphragm A being indicated at $h$. Assuming that the areas of the diaphragms A, B are O and O' respectively, the pressure on the diaphragm A will evidently be equal to $O.h$ and the pressure on the diaphragm B will be equal to:

$$O'(h \pm a.\sin \alpha).$$

The pressure required to be exerted by the spring W due to the normal depth of submersion is equal to:

$$(O-O')H.$$

The total pressure exerted upon the diaphragm B in the direction indicated by the arrow $k'$ will be equal to:

$$O'(h \pm a. \sin \alpha) + (O-O')H = O'(h-H) + OH \pm O'a. \sin \alpha.$$

As indicated by the arrow $k$, the pressure on the diaphragm A will be opposite and equal to the total pressure exerted on the diaphragm B under these conditions, and the following equation is thus obtained:—

$$O.h = O'(h-H) + OH \pm O'a. \sin \alpha$$

or $$(h-H)(O-O') = \pm O'a. \sin \alpha$$

or $$\pm \sin \alpha = \frac{(h-H)(O-O')}{O'a}$$

or $$\sin \alpha = \pm (h-H)\frac{(O-O')}{O'a}$$

In the latter expression the term $$\frac{O-O'}{O-a}$$

is evidently a constant and therefore the sine of the angle of inclination is proportional to the difference $(h-H)$ between the actual depth of submersion and the desired depth. The upward or downward inclination of the axis of the torpedo when ascending or descending to its proper depth is independent of its speed of movement or its acceleration, which constitutes an important advantage of the present invention.

Referring now to Figs. 3 and 4, a more complete constructional embodiment of the invention is illustrated, in which the diaphragms A and B are arranged closely adjacent to one another, being inclosed in a casing C located in the front portion of the torpedo.

The water has free access to the upper surface of the diaphragm A through holes F in the cover of the casing C which communicate with a space G surrounding the casing L in which the controlling spring M is located. The lower end of the spring M engages with the upper portion of the casing C and a rod K connected to the diaphragms A, B passes through the spring M and is connected thereto at the upper end of the spring by means of an adjusting nut N which serves to vary the strength of the spring. A bell crank lever mounted within the casing C serves to connect the rod K to the pilot motor E by means of a link P. The lower surface of the smaller diaphragm B is arranged to be influenced by the pressure of the water at the rear end of the torpedo by means of a pipe H communicating with the under side of the diaphragm B and terminating in a chamber I suitably located in the rear portion of the vessel.

It will be seen that the depth-controlling mechanism above described is very sensitive, not only to variations in the depth of submersion of the torpedo but also to variations in the angle of inclination of its axis, so that any variation from the correct depth of submersion will result in the horizontal rudder being continuously adjusted so as to cause the torpedo to return automatically to its proper course, the angle of inclination being gradually and continuously reduced as the true course is approached.

Two or more abutments are exposed to the opposing action of the pressure of the water at different points along the longitudinal axis of the torpedo. The opposing force of the water upon the abutments is different and the difference is opposed by a constant controlling force, such as for instance the spring M. Supposing now the torpedo is submerged too deep, then the difference between the opposing forces of the water on the two (or more) abutments is increased, since the abutments are of different areas as illustrated in the drawings (Fig. 3). It is clear that the pressure of the water on both abutments is increased. However, the higher pressure on the smaller abutment is counteracted by the higher pressure on a surface of the same area (as the small abutment) on the larger abutment. The pressure on the larger abutment is therefore higher than by a less deep submersion. The effect hereof is that the rudder is placed in such a position that the torpedo rises.

In case the torpedo is not submerged as deep as required, that is to say, as deep as the tension of the opposing spring is regulated for, the contrary will be the case.

An inclination of the torpedo has the result that the pressure pro unity of surface on the two abutments is not equal so that the resulting force of the water acting upon the two abutments of different area will displace the abutments in one or the other direction, effecting the rudder to be directed for raising or lowering the torpedo. In case of an inclination of the torpedo together with an undesired depth of submersion it can readily be understood that the opposing forces of the water on the abutments will always tend to correct the depth of submersion.

Many modifications may obviously be adopted without departing from the scope of the invention. For instance, instead of diaphragms, any equivalent device may be adopted.

What I claim is:

1. In a submarine vessel the combination of a device for controlling the vertical course of said vessel, a pair of abutments located within said vessel and having different effective areas, means for conducting opposing pressures upon said abutments proportionally to the pressure of the water at two longitudinally separated points on the vessel, means for exerting an independent predetermined pressure upon said abutments, and means for adjusting the position of said device in accordance with the position of said abutments.

2. In a submarine vessel the combination of a pair of abutments having unequal exposed areas located within said vessel, means for conducting opposing pressures to said abutments when the axis of said vessel is horizontal, a device for controlling the vertical course of said vessel, and means independent upon the depth of submersion of the vessel for counterbalancing the difference of pressure upon said abutments.

3. In a submarine vessel the combination of a device for controlling the vertical course of a vessel, a pair of abutments having unequal effective areas, means for subjecting said abutments to the opposing pressures of the water at longitudinally separated points in the vessel when submerged, means for exerting an independent predetermined pressure upon said abutments, and means controlled by the resulting pressure upon said abutments for adjusting the position of said device.

4. In a submarine vessel the combination of a device for controlling the vertical course of said vessel, a pair of abutments located within the vessel having different effective areas, means for subjecting the abutment having the larger effective area to the pressure of the water at the front portion of the vessel when submerged, means for subjecting the abutment having the smaller effective area to the pressure of the water at the rear portion of the vessel, means for connecting the two abutments mechanically together, a spring for exerting an independent predetermined pressure upon said abutments, and means dependent upon the position of said abutments relative to said vessel for controlling said device.

5. In a submarine vessel, the combination of a device for controlling the vertical course of the vessel; a pair of operatively connected abutments subject to opposing pressures of water from longitudinally separated points of the vessel when submerged, and having unequal effective areas; means for exerting an independent predetermined pressure on the abutments; and means controlled by the resulting pressure upon said abutments for adjusting the position of said device.

In testimony whereof I have hereunto set my hand in presence of two subscribing witnesses.

ABRAHAM JOHANNES van STOCKUM.

Witnesses:
ANTONIE ELBERTS DOYER,
HERMAN WILLEM DAENDELS.

Copies of this patent may be obtained for five cents each, by addressing the "Commissioner of Patents, Washington, D. C."